(12) United States Patent
Wootten et al.

(10) Patent No.: US 9,186,950 B2
(45) Date of Patent: Nov. 17, 2015

(54) METHODS AND APPARATUS FOR COMBINED VARIABLE DAMPING AND VARIABLE SPRING RATE SUSPENSION

(71) Applicant: Fox Factory, Inc., Watsonville, CA (US)

(72) Inventors: Dennis K. Wootten, Scotts Valley, CA (US); Robert C. Fox, Scotts Valley, CA (US); Joshua Benjamin Yablon, Oakland, CA (US); David M. Haugen, Pacific Grove, CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

(21) Appl. No.: 14/271,091

(22) Filed: May 6, 2014

(65) Prior Publication Data

US 2014/0353100 A1 Dec. 4, 2014

Related U.S. Application Data

(63) Continuation of application No. 12/717,867, filed on Mar. 4, 2010, now abandoned, and a continuation-in-part of application No. 12/407,610, filed on Mar. 19, 2009, now Pat. No. 8,894,050, said application No. 12/717,867 is a continuation-in-part of application No. 12/509,258, filed on Jul. 24, 2009, now Pat. No. 8,869,959.

(60) Provisional application No. 61/157,541, filed on Mar. 4, 2009, provisional application No. 61/038,015, filed on Mar. 19, 2008, provisional application No. 61/227,775, filed on Jul. 22, 2009.

(51) Int. Cl.
*B60G 17/048* (2006.01)
*B60G 15/12* (2006.01)
*B60G 17/04* (2006.01)
*B60G 17/08* (2006.01)
*F16F 9/34* (2006.01)
*F16F 9/44* (2006.01)
*F16F 9/512* (2006.01)

(52) U.S. Cl.
CPC .............. *B60G 17/048* (2013.01); *B60G 15/12* (2013.01); *B60G 17/0416* (2013.01); *B60G 17/08* (2013.01); *F16F 9/34* (2013.01); *F16F 9/44* (2013.01); *F16F 9/5126* (2013.01); *B60G 2202/152* (2013.01); *B60G 2202/314* (2013.01); *B60G 2202/322* (2013.01); *B60G 2500/22* (2013.01)

(58) Field of Classification Search
CPC ................. B60G 17/04; B60G 17/048; B60G 2202/152; B60G 2202/24; B60G 2500/2042; B60G 2500/22
USPC ............ 188/276–278, 282.8, 322.13, 322.15, 188/322.22
See application file for complete search history.

(56) References Cited

U.S. PATENT DOCUMENTS 3,525,512 A 8/1970 Hagwood
4,303,231 A 12/1981 Reuschenbach et al.
(Continued)

FOREIGN PATENT DOCUMENTS

EP 0855533 7/1998
EP 1655158 5/2006
(Continued)

*Primary Examiner* — Vishal Sahni (57) ABSTRACT

Pressure-sensitive vales are incorporated within a dampening system to permit user-adjustable tuning of a shock absorber. In one embodiment, a pressure-sensitive valve includes an isolated gas chamber having a pressure therein that is settable by a user.

2 Claims, 6 Drawing Sheets

(56) References Cited

U.S. PATENT DOCUMENTS

| | | | |
|---|---|---|---|
| 4,453,638 A * | 6/1984 | Wallace | 188/282.9 |
| 4,881,750 A | 11/1989 | Hartmann et al. | |
| 4,915,364 A | 4/1990 | Perlini | |
| 4,972,928 A * | 11/1990 | Sirven | 188/269 |
| 5,027,637 A | 7/1991 | Umetsu | |
| 5,190,126 A * | 3/1993 | Curnutt | 188/269 |
| 5,207,300 A * | 5/1993 | Engel et al. | 188/266.2 |
| 5,293,968 A | 3/1994 | Schuelke et al. | |
| 5,417,446 A | 5/1995 | Pileggi et al. | |
| 5,509,674 A | 4/1996 | Browning | |
| 5,509,675 A | 4/1996 | Barnett et al. | |
| 5,511,811 A | 4/1996 | Pileggi | |
| 5,538,276 A | 7/1996 | Tullis | |
| 5,649,692 A | 7/1997 | Gilsdorf et al. | |
| 5,725,226 A | 3/1998 | Cabrerizo-Pariente et al. | |
| 5,775,677 A | 7/1998 | Englund | |
| 6,095,541 A | 8/2000 | Turner et al. | |
| 6,105,988 A | 8/2000 | Turner et al. | |
| 6,135,434 A | 10/2000 | Marking | |
| 6,311,962 B1 | 11/2001 | Marking | |
| 6,322,058 B1 | 11/2001 | Tanigawa et al. | |
| 6,360,857 B1 | 3/2002 | Fox et al. | |
| 6,371,263 B1 | 4/2002 | Hoose | |
| 6,450,304 B1 | 9/2002 | Miller et al. | |
| 6,491,146 B1 | 12/2002 | Yi et al. | |
| 6,543,754 B2 | 4/2003 | Ogura | |
| 6,592,136 B2 | 7/2003 | Becker et al. | |
| 6,695,105 B2 | 2/2004 | Toiyama | |
| 6,752,388 B2 | 6/2004 | Thurow | |
| 6,782,980 B2 | 8/2004 | Nakadate | |
| 6,915,885 B2 | 7/2005 | Förster | |
| 6,938,887 B2 | 9/2005 | Achenbach | |
| 6,978,872 B2 | 12/2005 | Turner | |
| 7,000,907 B2 | 2/2006 | Achenbach | |
| 7,083,163 B2 | 8/2006 | Lemmens et al. | |
| 7,195,234 B2 | 3/2007 | Jordan et al. | |
| 7,308,976 B2 | 12/2007 | Turner | |
| 7,413,064 B2 | 8/2008 | Furuya et al. | |
| 7,703,585 B2 | 4/2010 | Fox | |
| 7,810,826 B2 | 10/2010 | McAndrews et al. | |
| 8,118,144 B2 | 2/2012 | Turner et al. | |
| 8,123,006 B1 | 2/2012 | Schroeder et al. | |
| 8,167,328 B2 | 5/2012 | Powell et al. | |
| 8,256,787 B2 | 9/2012 | Inoue et al. | |
| 8,276,719 B2 | 10/2012 | Trujillo et al. | |
| 8,464,850 B2 | 6/2013 | Fox | |
| 8,869,959 B2 | 10/2014 | Yablon et al. | |
| 2002/0108825 A1 * | 8/2002 | Miller et al. | 188/280 |
| 2002/0121416 A1 | 9/2002 | Katayama et al. | |
| 2002/0175035 A1 | 11/2002 | Achenbach | |
| 2002/0190445 A1 | 12/2002 | Achenbach et al. | |
| 2003/0029684 A1 | 2/2003 | Foprster | |
| 2003/0047398 A1 | 3/2003 | Toiyama | |
| 2003/0132073 A1 | 7/2003 | Nakadate | |
| 2003/0234144 A1 * | 12/2003 | Fox | 188/278 |
| 2005/0062249 A1 | 3/2005 | Lemmens et al. | |
| 2006/0011432 A1 | 1/2006 | Turner et al. | |
| 2006/0266602 A1 * | 11/2006 | Robertson | 188/322.15 |
| 2007/0057420 A1 | 3/2007 | Jordan et al. | |
| 2007/0119670 A1 | 5/2007 | Fox | |
| 2007/0227845 A1 | 10/2007 | Fox et al. | |
| 2008/0023935 A1 | 1/2008 | McAndrews et al. | |
| 2008/0053767 A1 | 3/2008 | Fox et al. | |
| 2008/0106012 A1 | 5/2008 | Turner et al. | |
| 2008/0116622 A1 | 5/2008 | Fox | |
| 2008/0296814 A1 | 12/2008 | Franklin et al. | |
| 2009/0001684 A1 | 1/2009 | McAndrews et al. | |
| 2009/0140475 A1 | 6/2009 | Turner et al. | |
| 2009/0236807 A1 * | 9/2009 | Wootten et al. | 280/5.514 |
| 2009/0277732 A1 | 11/2009 | Trujillo et al. | |
| 2010/0044975 A1 | 2/2010 | Yablon et al. | |
| 2010/0244340 A1 | 9/2010 | Wootten et al. | |
| 2011/0215551 A1 | 9/2011 | Galasso et al. | |

FOREIGN PATENT DOCUMENTS

| | | |
|---|---|---|
| GB | 942328 | 11/1963 |
| GB | 1099734 A | 1/1968 |

* cited by examiner

METHODS AND APPARATUS FOR COMBINED VARIABLE DAMPING AND VARIABLE SPRING RATE SUSPENSION

CROSS-REFERENCE TO RELATED APPLICATIONS

This application claims benefit of U.S. provisional patent application Ser. No. 61/157,541, filed Mar. 4, 2009. This application is also a continuation-in-part of U.S. patent application Ser. No. 12/407,610, filed on Mar. 19, 2009, which claims priority to U.S. provisional patent application Ser. No. 61/038,015, filed Mar. 19, 2008. This application is also a continuation-in-part of U.S. patent application Ser. No. 12/509,258, filed on Jul. 24, 2009, which claims priority to U.S. provisional patent application Ser. No. 61/227,775, filed Jul. 22, 2009. All of these applications are herein incorporated herein, by reference, in their entireties.

BACKGROUND OF THE INVENTION

1. Field of the Invention

Embodiments of the present invention generally relate to a suspension system for a vehicle. More particularly, the invention relates to a damper operable in conjunction with a pressure-sensitive valve that affects dampening characteristics of the damper.

2. Description of the Related Art

Vehicle suspension systems typically include a spring component or components and a damping component or components. Traditionally, mechanical springs, such as metal leaf or helical springs, have been used in conjunction with some type of viscous fluid based damping mechanism mounted functionally in parallel. More recently, compressed gas acting over a piston area has replaced mechanical springs as the spring component in some contemporary suspension systems. Dampers typically operate by restricting the flow of working fluid in a chamber housing to slow the movement of a piston and rod, especially during a compression stroke. Restrictions within dampers are typically preset for "average" use conditions and are not adaptable to varying conditions.

What is needed is a damper valve that operates at a user adjustable threshold and permits dampening to occur as needed or desired. Such a damper may be "tuned" to anticipate certain road conditions and/or rider conditions, especially with vehicles like bicycles or motor cycles. What is needed is a damper tuning function operating in conjunction with a gas spring to permit additional characteristics to be added to an overall suspension system for improved performance.

SUMMARY OF THE INVENTION

Embodiments of the invention generally relate to the use of pressure sensitive valves incorporated within a dampening system to permit adaptive damping of a shock absorber. In one embodiment, a pressure-sensitive valve includes an isolated compressible (e.g. gas filled) chamber having a pressure therein that is settable by a user. The gas in the chamber acts upon a piston surface in opposition to working fluid acting upon an opposing surface of the valve to affect the opening and closing of the valve in a damper. In one embodiment the pressure-sensitive valve is incorporated into a damper piston. In one embodiment a closed position of the valve prevents or impedes operation of the damper and with the valve in an open position; fluid Is permitted to travel more freely through the piston during a compression stroke of the damper. In another embodiment the valve is disposed in a fluid path between a damper and a reservoir for working fluid. In another example, a gas spring Is incorporated to operate with a pressure-sensitive valve and a gas chamber in the spring is in communication with an isolated gas chamber of the pressure-sensitive valve. In another embodiment, a pressure-sensitive valve includes a user-settable gas chamber pressure and an opposing separate compressible chamber permitting additional "tuning" of the damper for various road and/or riding conditions.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
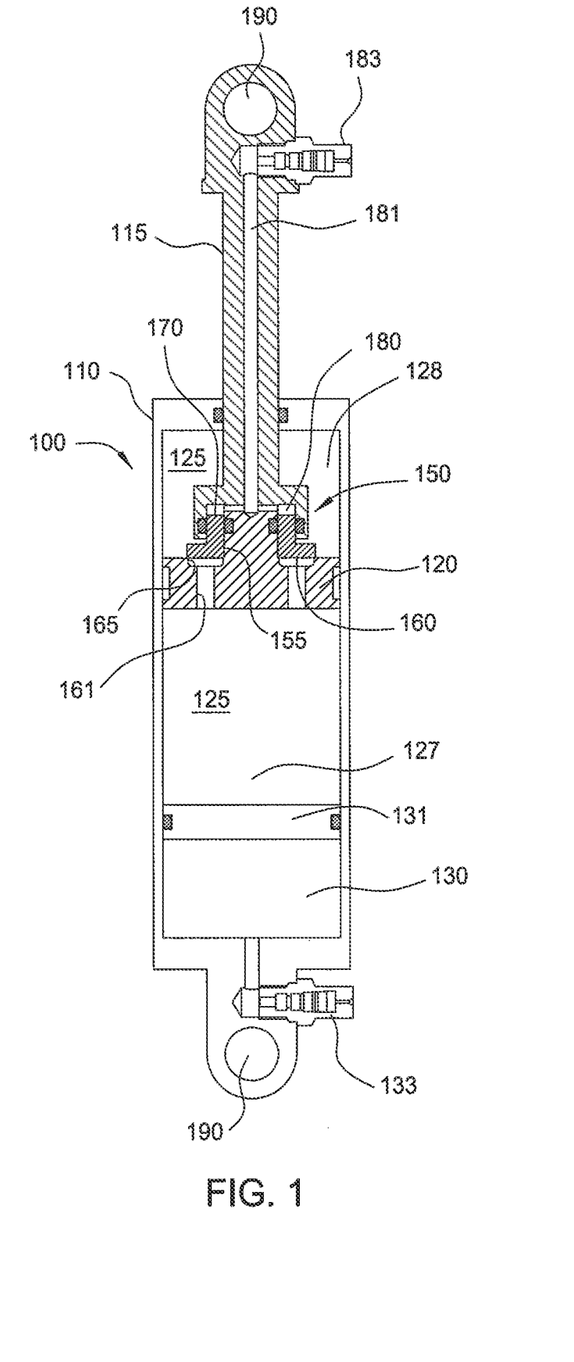
FIG. 1 is a section view of a damper with an "L-valve" disposed therein and FIG. 1A is a section view of the damper of FIG. 1 showing the "L-valve" in an open position.

FIG. 1 is a section view showing one embodiment of a suspension damper 100. The damper includes a housing 110 with a rod 115 and piston 120 arranged to move downward into the housing 110 during a compression stroke and upward back out of the housing during a rebound stroke. A working fluid (e.g. damping fluid such as hydraulic oil) 125 in the housing passes through the piston 120 during each stroke and, depending upon the dampening needs, is metered to control a rate of movement of the piston 120 in the housing 110. A gas filled reservoir 130 at one end of the housing 110 and separated from the working fluid by a floating piston 131 provides additional volume as the rod 115 moves into the housing and displaces the working fluid 125. The gas in the reservoir 130 is user-adjustable via a fill valve 133 (such as for example a Schrader or Presta type gas fill valve) mounted externally and in fluid communication with the reservoir 130. Eyelets 190 formed at each end of the damper 100 permit attachment to various parts of the vehicle allowing them to move relative to one another in relation to relative movement of the vehicle parts (e.g. wheel and chassis).

In the embodiment shown in FIG. 1, the piston includes an "L-valve" 150 (a volume of rotation about the axis of the damper and so named because of its I shaped appearance in section) that is designed to open and allow fluid 125 to pass through the piston 120 under certain conditions during the compression stroke of the damper 100. The L-valve is shown in more detail in FIG. 1A.

In one embodiment the valve assembly 150 includes an annularly-shaped member or valve member 155 including two piston surfaces 160, 170. Surface 160 is exposed to the working fluid 125 of the damper 100 while surface 170, having a relatively smaller surface area in the embodiment shown, is exposed to a source of pressurized fluid (e.g. gas) in a chamber 180. The pressurized gas acting upon surface 170 is supplied via a pathway 181 extending through the rod 115 and terminating in a user-adjustable fill valve 183 (such as for example a Schrader or Presta type gas fill valve). Chamber 180 and hence surface 170 are isolated (including by o-ring seals as shown but not numbered) from the working fluid 125 of the damper 100. In one embodiment, a constant gas pressure exerted on surface 170 biases the valve 150 to remain in a normally closed position because the pressure set in chamber 180 is higher (optionally substantially higher depending on the ratio of areas 160 and 170) than fluid pressure in a compression side 127 prior to operation of the damper (i.e. static or ambient fluid pressure).

In order to open the normally closed L-valve assembly 150, a force F1 (not shown), corresponding to a pressure P1-(not shown) exerted on (e.g. multiplied by) surface area 160 (area-A1), must be greater than an opposing force F2 (not shown), corresponding to a gas pressure (P2-not shown) exerted on surface area 170 (A2-not shown). In other words F1=P1× Area 160 and F2=P2×Area 170 and the valve assembly 150 will open during a compression stroke when P1×Area 160>P2×Area 170 (i.e. when F1>F2). The areas 160 and 170 as well as the pressures P1 and P2 are selectable by design and/or in use so that the valve opening threshold can be adjusted as desired. In one embodiment, when F1 becomes greater than F2, member 155 is moved upwardly in relation to the piston body and surface 160 of the L-valve, which normally obstructs a fluid path 162 through the piston (see FIG. 1A), is lifted off a valve seat 165 permitting fluid 125, during a compression stroke, to move from the compression 127 to a rebound side 128 of the damper housing 110. In use, the value of F1 is typically increased dynamically during a compression stroke and results from the dynamic increase in P1 during that stroke. The increase in P1 is proportional to the velocity of the compression. Another factor causing an increase in P1 (and correspondingly F1) is the position of the rod 115 within the housing 110. The further into the housing 110, that the rod 115 travels, the more volume is displaced within the housing 110 by the rod 115. Such displacement compresses chamber 130 ultimately increasing the pressure therein and correspondingly increasing the static or "ambient" pressure within the fluid 125 throughout The initial pressure charge in chamber 130 also has a bearing on the static and dynamic value of P1 at various times throughout the stroke. In practice, the pressure conditions necessary to open the valve 150 are determined by the design of the system itself, including the areas of surfaces 160, 170, the user-adjustable pressure supplied to chamber 180 and the user-adjustable pressure supplied to gas reservoir 130.

Figure 1A:
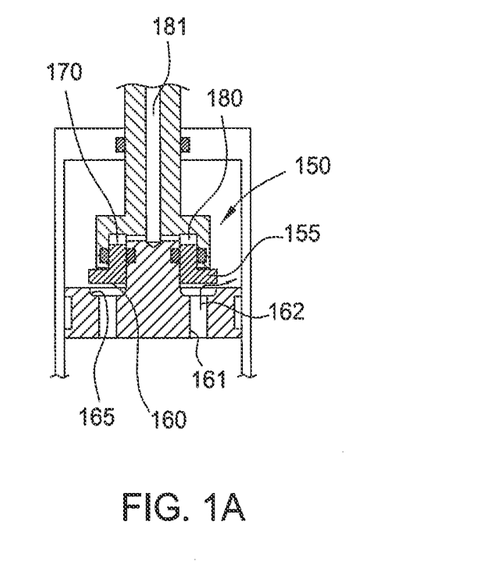

In one embodiment, the damper valve 150 functions when the piston 120 and rod 115 are moved during a compression stroke. Initially, flow through the piston is blocked by the seating of surface 160 on valve seat 165 brought about by a downward force ("downward" as shown in FIG. 1) of compressed gas on surface 170. As the compression stroke commences, pressure of working fluid 125 in the compression side 127 of the chamber rises (along with a slight drop in the pressure of the fluid in the rebound side) and, partially due to the relatively large surface area of 160, overcomes the force exerted by the pressurized gas in chamber 180 and the valve assembly 150 opens. After opening, working fluid 125 is metered through the piston to a rebound side 128 of the housing and the damper valve 150 operates to control velocity of the piston 120 and rod 115 as it moves downward in the housing 110. In FIG. 1, the L-valve 150 is a one-way valve permitting fluid to flow only in the compression stroke of the damper. While not shown in the Figure, return flow during the rebound stroke is typically provided by a separate fluid path and any metering necessary may be accomplished in a number of ways. In one embodiment, return flow occurs through dedicated orifices (not shown) that include check valves that block flow from side 127 of the piston to side 128 while allowing flow in the reverse. In one embodiment, the use of shims can keep a fluid path (including a return flow path) closed or restricted until a predetermined pressure or flow rate is achieved. In one embodiment shims are positioned underneath the L-valve 155 between surface 160 and 165 so that the L-valve keeps the shims from flexing until the valve assembly 150 opens at which time the shims may then flex to meter fluid through the piston during compression damping. FIG. 1A shows the L-valve 150 in an open position and illustrates the flow of working fluid 125 through flow path 161 (with the flow path shown by arrow 162) and into the rebound portion 128 of the chamber as the piston and rod move down in the compression stroke.

Figure 2:
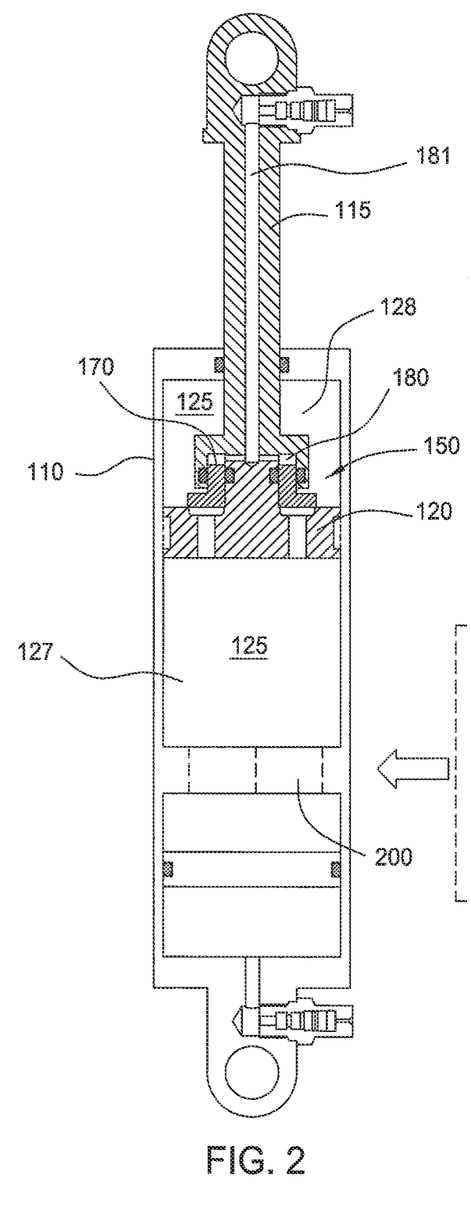
FIG. 2 is a section view of the damper of FIG. 1 with the addition of a blow-off assembly and FIG. 2A is a detailed section view of the blow-off assembly of FIG. 2.

In addition to the simple arrangement of FIGS. 1 and 1A, the L-valve can be used with additional components in order to make dampening more adjustable or more responsive to road or driving conditions. FIG. 2 is a section view of a damper similar to the one of FIG. 1 with the addition of a "blow off assembly" 200 in the damper housing 110. As with the damper of FIG. 1, the damper shown in FIG. 2 includes a piston 120 and rod 115 with an I-valve 150 disposed in the piston. Working fluid 125 in the damper causes the valve 150 to open when, as previously illustrated, an F1, in the compression 127 side of the housing 110, exceeds an F2 exerted on surface 170. In addition to metering of the fluid 125 that takes place during the compression stroke when the valve is open, fluid is also metered through a blow-off assembly 200 shown in detail in FIG. 2A.

Figure 2A:
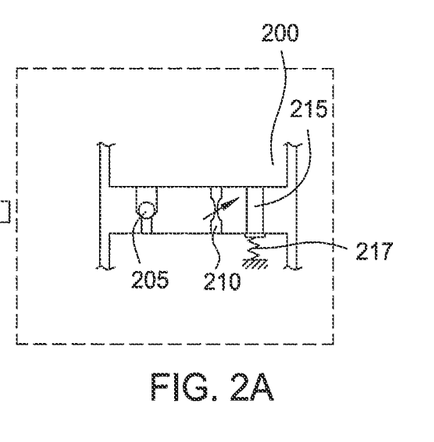

In one embodiment the "blow off assembly" 200 includes three subcomponents: a check valve 205; an adjustable orifice 210 and; a normally closed, spring actuated blow-off valve 215. The check valve 205 blocks the flow of fluid from above (i.e. 127) the assembly 200 to below the assembly 200, during a compression stroke while permitting the flow of fluid through the assembly, from below to above, during a rebound stroke. The adjustable orifice 210 is provided as another metering device in lieu of or addition to the L-valve 150 to provide additional dampening during the compression stoke. In one embodiment flow through the check valve 205 is metered by shims in the flow direction (not the check direction). In one embodiment flow through the orifice 210 is metered in one or both directions by shims. In one embodiment the check valve is checked and metered by a same set of shims. The blow-off valve 215 is also a one way valve operable during the compression stroke but is biased toward a closed position by a resilient member, such as for example in this case, a spring 217. The blow-off valve is designed to operate only in the event of a relatively high pressure spike, in chamber 127, during a compression stroke of the damper that is created when a "choke" condition arises as fluid is metered through the L-valve 150 and the adjustable orifice 210. A choke condition most often arises due to fluid flow created by relatively rapid movement of the piston 120 and rod 115 in the damper housing 110.

In one embodiment, the size of orifice 210, the initial pressure in chamber 130 and the pressure P2 in chamber 180 are set (and the areas 170 and 160 are correspondingly tailored) such that upon initial movement of the suspension in compression, fluid travels from above to below assembly 200 through the orifice 210 while valve 150 remains closed. When the piston (including valve 150) has traveled sufficiently, pressure in chamber 127 is increased (due to compression of the gas in chamber 130) and valve 150 opens thereby allowing fluid to flow from below to above the piston along path 162. In one embodiment, the foregoing parameters are adjusted such that both valve 150 and orifice 210 allow fluid flow substantially simultaneously during compression. In one embodiment, blow off valve 217 is set to allow excess fluid to flow from above the assembly 200 to below when pressure in chamber 127 is increased dramatically (such "blow off" thereby reducing the pressure in chamber 127) and beyond the flow rate capabilities of other damping valve mechanisms within the damper. In one embodiment the blow off valve 217 comprises one or more shims.

Figure 3:
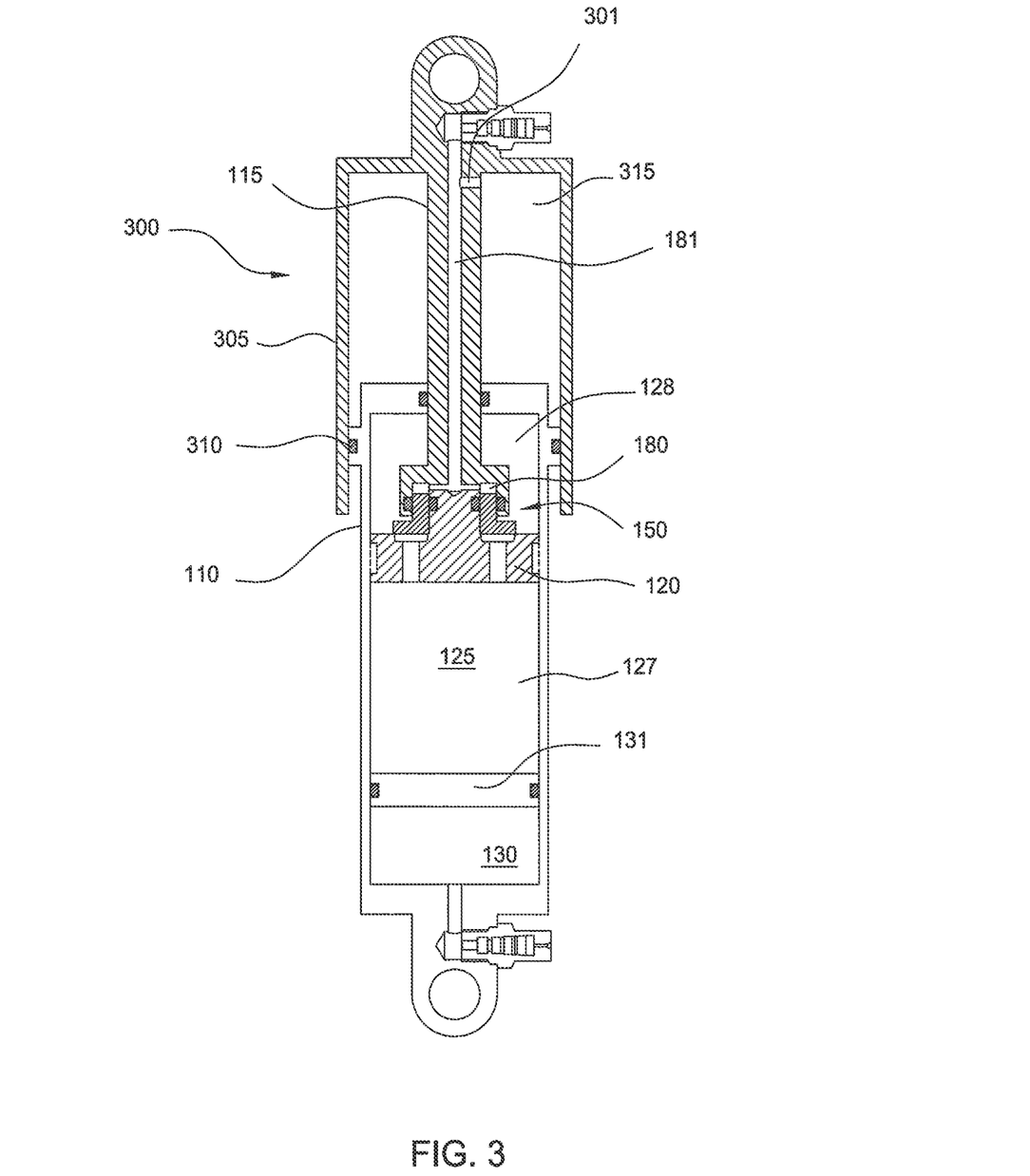
FIG. 3 is a section view of the damper of FIG. 1 with the addition of a gas spring operable in conjunction with the damper.

FIG. 3 is an embodiment of a damper with an L-valve 150 and including the addition of a suspension gas spring. Gas springs and their operation are disclosed in Patent Application No. U.S. 2009/0236807 A1, assigned to the assignor hereof and that application is incorporated by reference herein in its entirety. Similarly to the damper of FIG. 1, the embodiment of FIG. 3 includes a piston 120, rod 115 and L-valve 150 for metering of working fluid, along with a compressible chamber or reservoir 130 and floating piston 131 to compensate for the area of the rod 115 entering the housing. Gas springs operate with a compressible fluid, such as air or some other gas to provide resilience or "springiness" to a suspension system. Unlike a simple and constantly wound helical spring, the force (corresponding to pressure acting on a piston area of the suspension spring piston) versus the linear travel or displacement of a single chamber gas spring is not linear. For example, a gas pressure compression curve approximates linearity during an initial portion of travel but then rapidly becomes exponential and a gas sprung shock absorber typically becomes increasingly rigid in at least the last ⅓rd of its stroke. In FIG. 3, a gas spring 300 includes an upper enclosure 305, a seal 310 and a seal (not numbered) in housing 110 surrounding rod 115, all enabling a gas chamber 315 in the enclosure to remain sealed as the enclosure 305 moves axially with the rod and piston relative to the damper housing 110 to compress gas in the gas chamber 315 during a compression stroke. Notably, the gas chamber 315 in the embodiment of FIG. 3 is in fluid communication with the chamber 180 via a fluid path 301. Therefore, like chamber 180, the gas spring is initially adjustable by a user via fill valve 183 and the gas in both chambers 180, and 315 will increase in pressure as the gas spring 300 compresses during the compression stroke of the shock absorber and corresponding damper 100. In one embodiment the gas spring 315 comprises a multi-chamber gas spring system (optionally staged by communication valves). In one embodiment the gas spring 315 comprises a suitable combination of mechanical and gas springs.

In one embodiment the initial fluid pressures and piston areas are configured so that a shock, such as is shown in FIG. 3, is initially compliant. For example, the pressure P2 within chamber 315 is set to provide a relatively "soft" spring (compliant vehicle ride) through a certain initial percentage of the compression stroke of the shock (e.g. 50%). During the initial compression, F2 is relatively light in comparison to F1 (based partially on the pressure in chamber 130). Such configuration results in a relatively compliant gas spring combined with a relatively low resistance damper. Once the spring reaches a point in its travel (e.g. beyond for example 50%) where the compression pressure curve for the gas 315 becomes exponentially increasing, the corresponding pressure P2 in chamber 180 and force F2 become exponentially increasing while the pressure in chamber 130 continues to increase substantially linearly. The result is that both the gas spring and the piston damping become increasingly (exponentially) "stiff" during the second half of the compression stroke. Such a configuration allows for a shock system that is very compliant over light to moderate terrain yet very resistant to bottom out over extreme terrain or when landing large jumps.

The arrangement of FIG. 3 can provide the benefits of both a gas spring and a damper and is operable in a number of ways depending on road conditions and pre-settings. As illustrated, in one embodiment, the shock of FIG. 3 may provide an initially soft ride to minimize the effect of small bumps on the surface of a road or trail. As the severity/magnitude of the bumps increase and more of the compression stroke is needed, the shock absorber becomes increasingly stiff, effectively adding dampening characteristics (In addition to the stiffening spring) to slow the operation of the damper and avoid a bottom-out position. The gas spring causes the shock to reserve some travel in the case of an additional "bump event" at a time when the shock would otherwise be completely compressed due to gravitational forces. In other words, the shock embodiment described in reference to FIG. 3 herein may also provide resistance to "g-out" During an encounter with a long duration low frequency terrain feature, such as a long u-shaped valley, a suspension (particularly a compliant one) damper may slow bleed through a portion or all of its compression stroke. When that happens, the shock may be left with little remaining stroke to account for subsequent terrain features (i.e. the shock will slow bleed to bottom out). In one embodiment hereof the position dependent rigidity, based on the compression of the gas spring of FIG. 3, that shock may be configured to resist g-out due to increased rigidity as a function of compression stroke position. While the embodiment of FIG. 3 illustrates a gas spring in conjunction with the pressure sensitive valve, the gas spring may be replaced with a coil spring or any other type of device having a non-linear compression curve. Further, the shock of FIG. 3 may include the blow off assembly of FIG. 2A or any of the valves shown in FIG. 4, 5 or 6.

In certain embodiments hereof, other valves could be used instead of, or in addition to, the "L-valve." For example, U.S. Pat. No. 5,190,126 shows a valve having a user adjustable chamber with pressurized gas. Rather than having the chamber at a location where it urges the valve to a closed position, the valve incorporates a chamber at a location that reduces, rather than increases the force needed to open the valve. The valve of the '126 patent may be adopted for use in any suitable arrangement hereof and that patent is incorporated by reference in its entirety herein.

Figures 4, 4A:
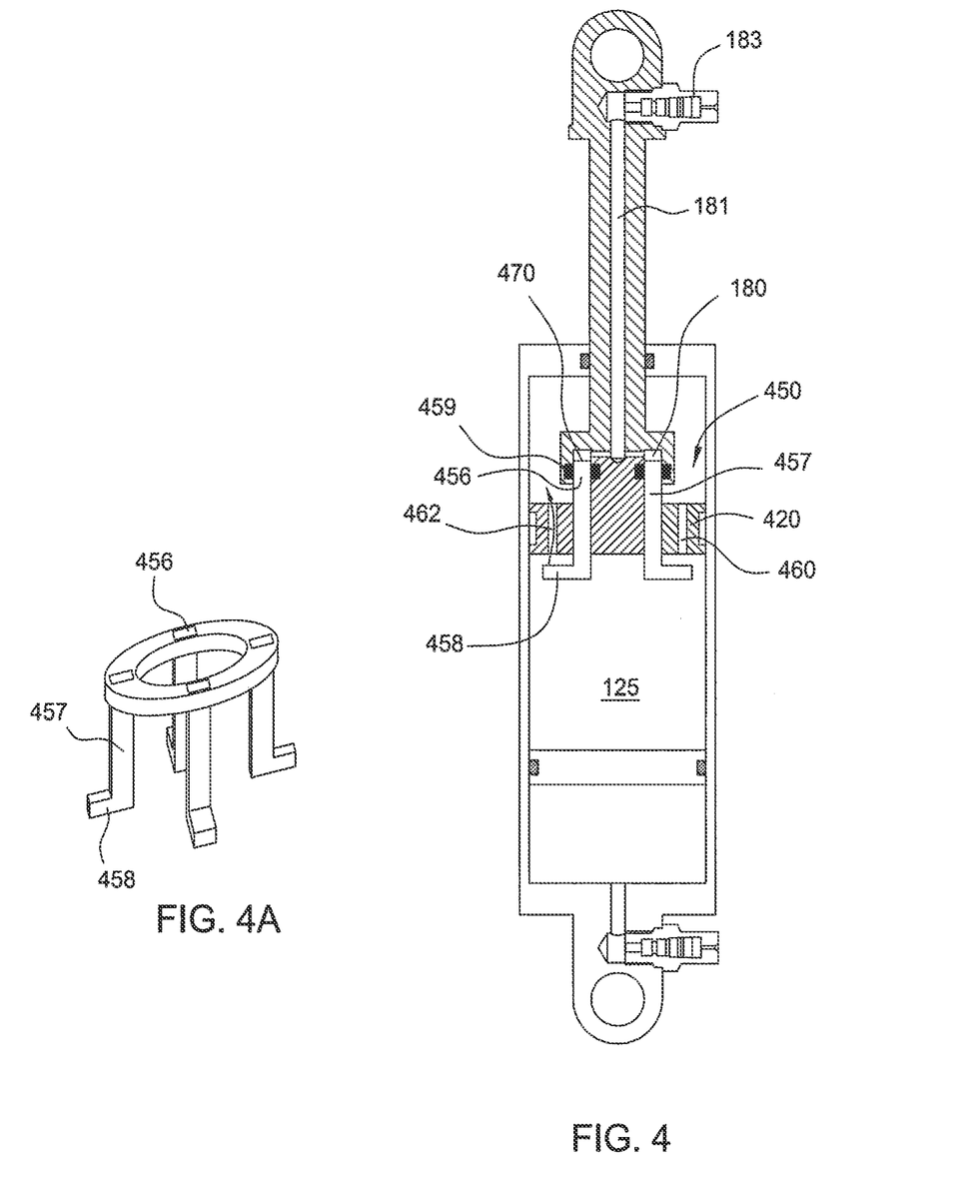
FIG. 4 is a section view of a damper with a variation of an "L-valve" disposed in a piston thereof and FIG. 4A is a perspective view of one movable portion of the valve of FIG. 4.

FIGS. 4 and 4A illustrate another type of valve disposed in a damper piston; one that is pressure-sensitive and operates in many respects as the L-valve shown in FIGS. 1-3. In the embodiment, referring to FIG. 4, a piston 420 includes an L-valve 450 having an axially movable, annularly-shaped member 456 sealed in the valve housing with seal members 459 and having a number of individual members 457 (collet-type fingers, for example) extending from a lower end thereof through the piston body 420. FIG. 4A is a perspective view of member 456 of FIG. 4.

In FIG. 4, the valve 450 is shown in an open position with the flow of fluid through the valve shown by arrow 462. Like the previously described valves, the valve of FIG. 4 includes a chamber 180, the pressure of which is user-adjustable via a fluid pathway 181 and a fill valve 183. Gas in chamber 180 acts upon a surface 470 of movable members 457 to urge a footed portion 458 of each member 459 away from a seated position against a lower end of each corresponding fluid path 460. In one embodiment, the valve is biased normally open but tends to close as fluid 125 passing through paths 460 during the compression stroke, acts on the footed portions 458 of each member 457 and urges them upwards and into a seated position with a lower surface of the fluid paths 460. As, during a compression stroke, the dynamic pressure builds below each "foot" 458, due to fluid "rushing" toward each corresponding orifice 460, each foot and hence the entire valve 456 is urged upwardly against the preset pressure in chamber 180. When the compression stroke is fast enough, the dynamic lower pressure, induced by flow through orifices 460, will create a force due to the pressure acting over each foot and will urge the valve toward a closed position. The net result is that the valve of FIG. 4 can be configured as a velocity dependent valve where damping is increased only at selected compression velocities above a predetermined threshold (which is based on the pressure in chamber 180).

Figure 5:
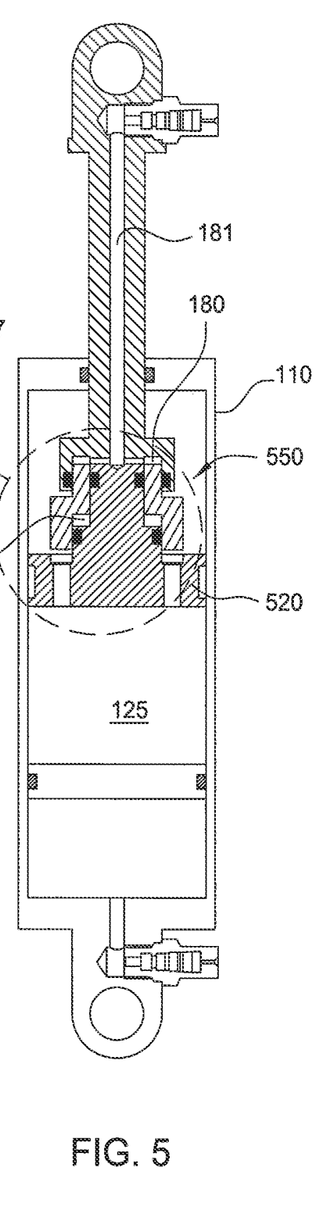
FIG. 5 is a section view of a damper having a valve in a piston thereof, the valve having a user-adjustable chamber and an opposing isolated chamber
Figure 5A:
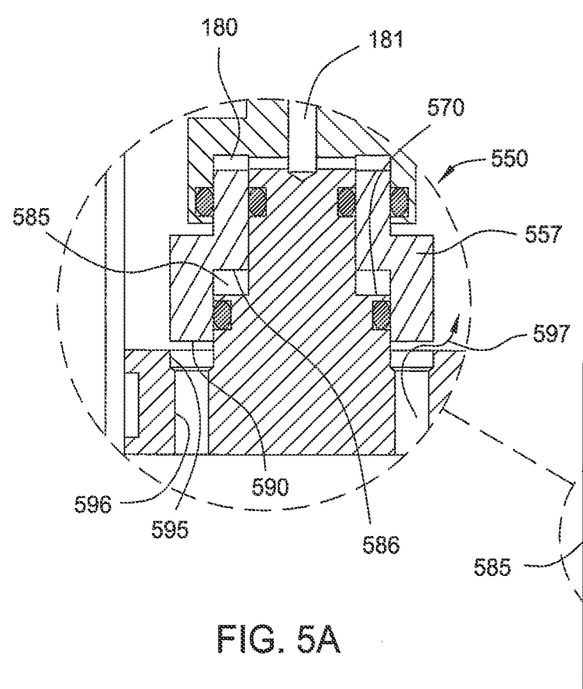
FIG. 5A is an enlarged view thereof.

FIGS. 5 and 5A illustrate another valve design, also installed in a damper piston 520. The valve operates much like the aforementioned "L-valves" except that it includes an additional compressible (e.g. gas filled) chamber 585 acting over area 586 in contravention to the pressure in chamber 180 over the upper area (e.g. 170). In one embodiment the valve 550 includes an axially moveable member 557 that is sealed in the piston housing. Member 557 includes a lower surface 590 constructed and arranged to seat on a valve seat 595 to block a fluid path 596 formed in the piston 520. In one embodiment and like the valves in the other embodiments, the valve 550 may include a user adjustable, isolated chamber 180 at an upper end thereof arranged to act upon an upper surface 570 of the member 557. Additionally, another isolated compressible chamber 585 (in one embodiment a closed preset volume of gas such as atmospheric pressure gas), optionally at atmospheric pressure, acts in an opposing manner on a surface 586 of member 557. A purpose of having the chamber 585 at atmospheric pressure is to ensure a piston area acted upon by a pressure lower than any other pressure in the damper system thereby more easily biasing the valve to a normally closed position. In the embodiment of FIG. 5, chamber 585 is designed to assist the valve in closing, rather than in opening but an opposite effect is possible simply by presetting the chamber to a pressure higher than the pressure of the control fluid in chamber 180 (e.g. higher than chamber 180) before a compression stroke. In one embodiment the valve of FIG. 5 operates substantially independently of the gas pressure in chamber 130 and the corresponding ambient pressure of the working fluid. As such the pressures in chambers 180 and 585 can be adjusted as desired to achieve a balance on the static bias of the valve (including a static "neutral bias—neither open nor closed). The static biasing configuration is offset upon induced motion whereby the dynamic flow of fluid through the piston creates a dynamic force (flow induced pressure) on the pressure that changes the net force resolution on the valve 557. In one embodiment, the valve of FIG. 5 may be neutrally balanced in a static condition by equating the pressures in chambers 180 and 585. In one embodiment such a configuration is placed within the shock of FIG. 3 such that the air spring pressure 315 communicates with chamber 180. As the shock moves further into compression, the neutral initial balance is displaced by an increasingly strong valve closing bias. In one embodiment the pressure in chamber 180 is set initially higher than the pressure in chamber 585 resulting in an initial closure bias. In one embodiment the pressure in chamber 180 is initially set lower than the pressure in chamber 585 thereby biasing the valve initially open. The aforementioned F1 and F2 calculations are, in principle, applicable to this valve regarding opening threshold provided that F1 is a sum of the pressure in chamber 585 times the area 586 and the working fluid pressure (with its static and dynamic components) over any net area difference between areas 586 and 170.

In some embodiments as shown in the FIGS. 5, 5A, the valve is shown in an open position with the flow of fluid through path 596 shown by arrow 597. By "tuning" the chamber 180 and the presetting isolated chamber 585, operation of the valve 550 and therefore the damper 100 can be predetermined for certain conditions. For example, the addition of the preset chamber 585 effectively reduces (optionally to zero depending on the area ratios chosen) the piston area acted upon by working fluid 125 as the damper is compressed. By reducing the net area acted on upwardly by the working fluid during compression, opening of the valve can be relatively retarded. In one embodiment, the pressure-sensitive valve can be equipped only with a sealed atmospheric chamber or a sealed chamber of any pre-settable pressure. Such chamber can be located at either "end" of the valve permitting it to affect operation in any number of ways as it eliminates a portion of a piston surface that would otherwise be acted upon by working fluid in the damper.

Figure 6:
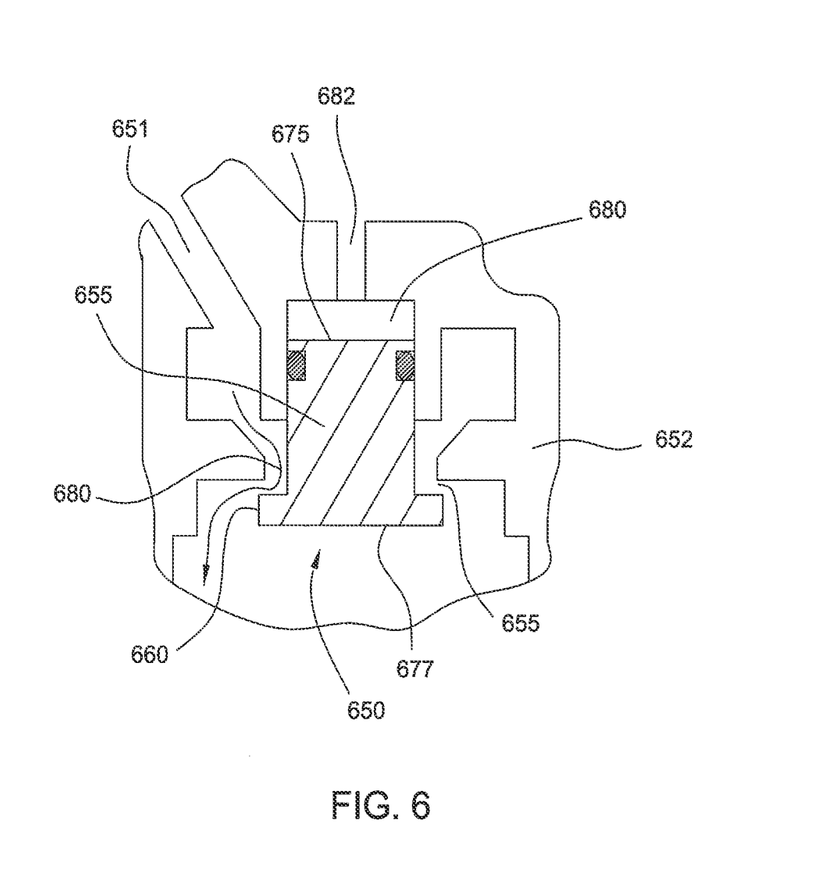
FIG. 6 is a section view of a valve disposed in a fluid path between a damper and remote reservoir.

The pressure-sensitive valves disclosed herein need not be incorporated in or even adjacent a damper piston but can be remotely located in any fluid path between a damper chamber and a reservoir. FIG. 6 is a section view of a pressure-sensitive valve 650 disposed not in a piston, but in a fluid path 651 between a damper chamber and a remote reservoir (not shown). Remote reservoirs provide the same function as the reservoir shown in FIG. 1, but consist of a separate housing and chamber. Remote reservoirs are shown and explained in U.S. Pat. No. 7,374,028, which is incorporated by reference herein in its entirety. In the arrangement of FIG. 6, the valve 650 includes a housing 652 with an axially moveable member 655, sealed in the housing and including a flange 660 constructed and arranged to seat and unseat on a seating surface 665 formed at a lower end of the valve body 652.

In one embodiment the valve of FIG. 6 includes a chamber 680 that is in communication with ambient air pressure through a pathway 682. Any valve configuration described herein may be suitably used to control flow between a chamber and a reservoir. In one embodiment the valve of FIG. 6 is not mounted in a damper piston and does not move with the piston, and it tends to operate in a position-sensitive manner while being minimally sensitive to velocity of the piston. For example, in the Figure the valve is shown in an open position with fluid flow shown by arrow 680. As the piston and rod move into the chamber (not shown) in the compression stroke the corresponding pressure developed by the floating piston and gas-filled reservoir (not shown) will increase pressure of the working fluid acting on surface 677. In this manner, the velocity of the piston and rod have reduced bearing on the operation of the valve, while the position of the piston and rod are largely determinate of the valve's position.

As shown in the description and Figures, embodiments permit pressure-sensitive valves to be incorporated into and/or used in conjunction with fluid dampers to provide various means for a user to tune a damper based on dynamic road conditions. In some embodiments, the pressure-sensitive valve is urged to a closed position to increase dampening in the shock absorber. In other instances, the valves are urged to an open position to permit fluid to flow between the compression and rebound sides of the chamber in order to decrease dampening. In some embodiments the valve is incorporated in a piston between a compression chamber and a "rebound" receiving chamber and in other embodiments the valve is incorporated between a compression chamber and a "reservoir" receiving chamber. Either of the reservoir chamber and the rebound chamber (and any other suitable chamber) enable damping by receiving working fluid from the compression chamber during a compression stroke.

While the foregoing is directed to embodiments of the present invention, other and further embodiments of the invention may be devised without departing from the basic scope thereof, and the scope thereof is determined by the claims that follow.

The invention claimed is:

1. A vehicle suspension damper comprising:
   a cylinder and a piston assembly comprising:
      a piston; and
      a piston rod;
   a working fluid within said vehicle suspension damper, said vehicle suspension damper comprising a compression chamber configured for holding a first portion of said working fluid and a rebound chamber configured for holding a second portion of said working fluid, wherein said piston comprises:
      a first annular surface in fluid communication with said rebound chamber;
      a second, opposed, annular surface in fluid communication with said compression chamber; and
      a plurality of openings extending through said piston from said first annular surface to said second, opposed, annular surface thereof; and
   a pressure-sensitive valve disposed in said vehicle suspension damper between said compression chamber and said rebound chamber, said pressure-sensitive valve comprising:
      a first annular valve surface having a first surface area in communication with a pressurized gas, wherein said pressurized gas is retained within a pressurized gas chamber having walls that comprise surfaces of said piston rod and said first annular valve surface, wherein said piston rod comprises a fluid pathway therein, wherein said pressurized gas chamber is in fluid communication with a user-adjustable fill valve via said fluid pathway; and
      an opposed annular valve surface having a second surface area that is greater than said first surface area and is in communication with said working fluid moving through said plurality of openings, wherein said opposed annular valve surface in communication with said working fluid is positioned and arranged to contact one of said first annular surface of said piston and said second, opposed, annular surface of said piston at a location of said plurality of openings extending through said piston, thereby upon contact, selectively sealing off said plurality of openings,
   whereby, in a compression stroke of said piston, said pressure-sensitive valve opens, permitting said working fluid to move from one side of said piston to the other side of said piston when a force exerted by said pressurized gas on said first annular valve surface is overcome by an opposing force exerted on said opposed annular valve surface by said working fluid.

2. The damper of claim 1, wherein said pressure-sensitive valve at least partially surrounds a portion of said piston.

* * * * *